(No Model.)
E. THOMSON.
APPARATUS FOR ELECTRIC WELDING AND WORKING METALS.
No. 396,012. Patented Jan. 8, 1889.
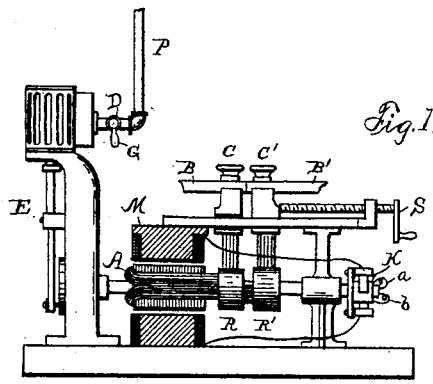
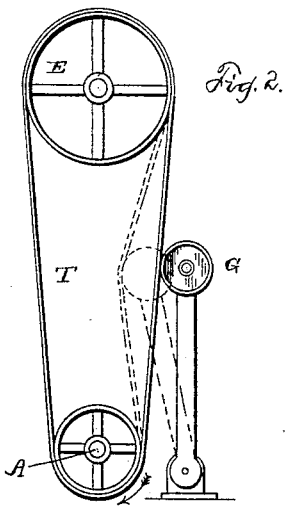
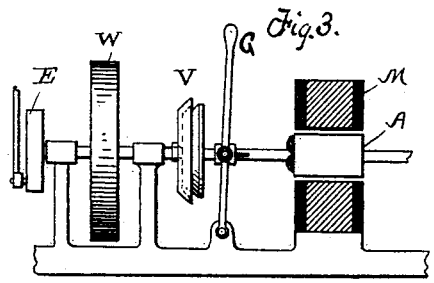
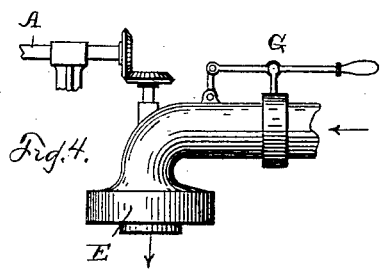
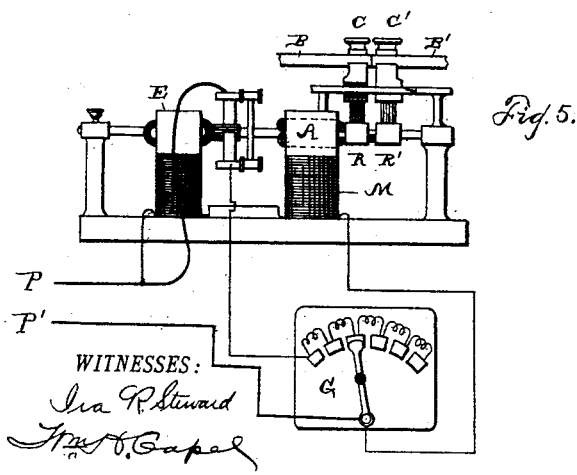
WITNESSES:
Ira R. Steward
Fred C. Capel
INVENTOR,
ELIHU THOMSON
BY
Townsend & MacArthur
ATTORNEYS

UNITED STATES PATENT OFFICE.

ELIHU THOMSON, OF LYNN, MASSACHUSETTS.

APPARATUS FOR ELECTRIC WELDING AND WORKING METALS.

SPECIFICATION forming part of Letters Patent No. 396,012, dated January 8, 1889.

Application filed May 17, 1888. Serial No. 274,194. (No model.)

*To all whom it may concern:*

Be it known that I, ELIHU THOMSON, a citizen of the United States, and a resident of Lynn, in the county of Essex and State of Massachusetts, have invented a certain new and useful Apparatus for Electric Welding and Working Metals, of which the following is a specification.

My invention relates to those processes of welding, forging, shaping, soldering, brazing, or other working of metals in which a current of electricity of large volume passed through the portion of work to be operated upon is employed as the heating agent for bringing the work to the proper or desired temperature.

The object of my invention is to provide a simple and effective apparatus suitable for use in such operations, and especially adapted for cases where the work is heavy and currents of very large volume are required.

My invention consists, essentially, in the employment of a dynamo-machine or similar generator, from which the welding-currents are directly or indirectly derived, and which is driven by any suitable motive power—such as a water-wheel, an electric motor, a steam-engine, or other device—and in regulating or governing the current by determining the speed at which the generator shall be driven by the particular motive power employed, through the agency of any suitable devices placed in proper proximity to the work or controllable by the operator who manipulates the work. For controlling the power applied to the dynamo, and hence the speed and electric output of the same, any desired means may be employed. Some of these means I have described and shown in the accompanying drawings.

By the proper manipulation of the apparatus the power applied to the dynamo may be thrown on either quickly or gradually, and thrown off or diminished in amount either quickly or gradually, so as to control the heating of the object included in the circuit, and to permit the consumption of power to be entirely cut off when the work is accomplished.

I have illustrated my invention as applied to apparatus employed in the operation of electric welding according to the invention forming the subject of my prior patents, Nos. 347,140 and 347,141.

In the accompanying drawings, Figure 1 is a side elevation and partial section of an apparatus by which my invention may be practiced. Figs. 2, 3, 4, and 5 illustrate other devices which may be employed in the operation of welding according to my invention.

In Fig. 1 C C' indicate holding or conducting clamps, one of which is insulated from the other, and which are adapted to grasp firmly the pieces B B' to be welded together. S indicates a screw or other device by which one piece may be forced against the other in the welding operation. The clamps C C' are electrically connected, by means of suitable brushes borne by the clamps, with conducting-rings R R', upon which the brushes rest. The rings R R' are suitably connected with conductors upon the armature A of a dynamo-machine. The field-magnet of the dynamo (indicated at M) is supplied with current taken from a commutator, K, which in turn is connected by suitable wires (indicated at a a) with a conductor upon the armature A, and preferably independent of that which supplies the welding or working current to the rings R R'.

The construction of the dynamo does not form any part of my present invention, and is here only incidentally referred to.

The form and construction of dynamo and the manner of connecting the clamps with the same form the subject of another application filed by me of even date herewith, Serial No. 275,520.

In Fig. 1 the dynamo is illustrated as driven by a steam-engine, E, of any suitable construction, the throttle-valve of which (indicated at D) is properly located in proximity to the welding apparatus, so that it may be manipulated by the workman carrying on the welding operation, or is otherwise placed under his control.

P indicates the pipe through which steam is fed to the engine.

The manner of using the apparatus is as follows: The engine and dynamo being at rest, the pieces to be welded or otherwise treated are inserted in the clamps C C', so as to form the circuit for the current from one clamp to the other, and the handle G is turned so as to let in steam to drive the engine E and turn the armature-shaft of the dynamo. Operating the throttle-valve so as to increase the steam will give an increased volume of current from the dynamo, owing to the increase of speed of rotation thereof, while a decrease of steam will cause the dynamo to slow down, thus decreasing the current. When the desired heat of the piece or pieces has been obtained, the steam may be cut off or gradually diminished for the purpose of gradually cooling the work; or the valve G may be manipulated in any other desired way to control the rapidity or degree of heating or cooling of the object in circuit between the clamps.

Other devices controlled and used in a similar manner to the throttle-valve are shown in the following figures.

In Fig. 2 the motive power of any suitable construction is supposed to be applied to driving a pulley, E, which is connected by a loose belt, T, with the pulley A upon the armature-shaft. G indicates a belt-tightener, whereby the belt may be tightened or loosened to control the power delivered to the pulley upon the armature-shaft, and thereby to determine the speed of the dynamo and the current delivered from the same to the work.

In the arrangement shown in Fig. 3 the speed of the dynamo-shaft is determined by means of a lever, G, which operates upon a clutch, (indicated at V,) one member of which is operated by the lever, while the other member is rotated from the engine E. The fly-wheel of the engine is indicated at W. The clutch V being a friction-clutch, it is obvious that by suitably manipulating the lever G the power delivered to the armature-shaft may be varied to determine the speed at which the armature shall revolve and the extent or degree of heating or cooling of the work supplied with current directly or indirectly from the armature.

In Fig. 4 the armature is supposed to be run by a water-wheel, E, and a gate or valve, G, in the part supplying water to E serves the purpose of determining the electric current acting upon the work.

In the modification indicated in Fig. 5 the armature of the dynamo-machine is illustrated as driven by an electric motor, E, supplied from mains P P'. The field-magnet of the electric motor is in one branch of the circuit of the mains P P', while the armature of the motor is in another branch, including a variable resistance of any suitable character controlled by a switch-lever, G. By operating the switch-lever it is obvious that the speed of the driving electric motor E may be varied as desired to determine the speed of the dynamo A and the volume of the current in the circuit between the clamps C C'. The field M of the dynamo may be conveniently energized from the mains P P'.

What I claim as my invention is—

An apparatus for electric welding, forging, brazing, or other metal-working operations in which an electric current is employed as the heating agent, comprising, in combination, a dynamo-machine supplying heating-current, a driving-power for the same, suitable clamps or holders for the work, and suitable means in proximity to the work and under the control of the operator for throwing the driving-power on or off to any desired amount, as desired, to vary the current and the heating effects in the work at will.

Signed at Lynn, in the county of Essex and State of Massachusetts, this 14th day of May, A. D. 1888.

ELIHU THOMSON.

Witnesses:
　J. W. GIBBONEY,
　F. R. HILL.